(12) United States Patent
McIntyre

(10) Patent No.: US 11,254,142 B2
(45) Date of Patent: Feb. 22, 2022

(54) MULTIDIMENSIONAL IMAGE REPRODUCTION TECHNIQUE

(71) Applicant: Kevin A. McIntyre, Greer, SC (US)

(72) Inventor: Kevin A. McIntyre, Greer, SC (US)

( * ) Notice: Subject to any disclaimer, the term of this patent is extended or adjusted under 35 U.S.C. 154(b) by 56 days.

(21) Appl. No.: 16/991,475

(22) Filed: Aug. 12, 2020

(65) Prior Publication Data

US 2020/0369042 A1 Nov. 26, 2020

Related U.S. Application Data

(63) Continuation-in-part of application No. 16/399,067, filed on Apr. 30, 2019, now Pat. No. 10,744,796.

(60) Provisional application No. 62/673,251, filed on May 18, 2018.

(51) Int. Cl.
*B41J 3/407* (2006.01)
*B29C 41/22* (2006.01)
*B29K 105/00* (2006.01)

(52) U.S. Cl.
CPC ............ *B41J 3/4073* (2013.01); *B29C 41/22* (2013.01); *B29K 2105/0032* (2013.01)

(58) Field of Classification Search
CPC ..... B41J 3/4073; B41J 11/0015; B29C 41/22; B44F 11/00; B29K 2105/0032; B41M 7/00
See application file for complete search history.

(56) References Cited

U.S. PATENT DOCUMENTS

| | | | |
|---|---|---|---|
| 1,050,236 A | 1/1913 | Schmitt | |
| 2,068,204 A | 1/1937 | Smith | |
| 4,505,944 A | 3/1985 | Turner | |
| 8,708,440 B2 * | 4/2014 | Nagase | B41J 29/17 347/6 |
| 9,776,430 B2 | 10/2017 | Swei et al. | |
| 9,815,312 B2 * | 11/2017 | Pal | B41M 5/506 |
| 2003/0067529 A1 | 4/2003 | May et al. | |
| 2005/0195261 A1 | 9/2005 | Stelter et al. | |

OTHER PUBLICATIONS

History of Ink and It's Development; http://www.realcolorwheel.com/ink.htm.
Elmer W. Zimmerman; Iron Gallate Inks—Liquid and Powder; Research Paper RP807; Part of Journal of Research of the National Bureau of Standards, vol. 15, Jul. 1935.
Elmer Eusman; Manufacture of Ink; The Iron Gall Ink Website; https://irongallink.org.igi_index048a.html; 1988.
Antonio Da Costa et al.; Scanning Electron Microscopic Characterization of Iron-Gall Inks from Different Tannin Sources—Applications for Cultural Heritage; 2014.
Hue P. Le et al.; Progress and Trends in Ink-Jet Printing Technology; Journal of Imaging Science and Technology; vol. 42, No. 1; Jan./Feb. 1998.

* cited by examiner

*Primary Examiner* — An H Do
(74) *Attorney, Agent, or Firm* — Joseph T. Guy; Patent Filing Specialist Inc.

(57) ABSTRACT

The instant invention is related to a method for replicating an object. The method includes providing an object comprising an outer surface and a channel; applying dry tannin powder to the outer surface of the object wherein at least a portion of the dry tannin powder adheres to the outer surface as imaging tannin; and placing an aqueous solution of an iron salt in the channel wherein the iron salt diffuses through the object to convert said imaging tannin into a replica of the object.

15 Claims, 2 Drawing Sheets

MULTIDIMENSIONAL IMAGE REPRODUCTION TECHNIQUE

CROSS-REFERENCE TO RELATED APPLICATIONS

The present application is a continuation-in-part application of pending U.S. patent application Ser. No. 16/399,067 filed Apr. 30, 2019 which, in turn, claims priority to U.S. Provisional Patent Application No. 62/673,251 filed May 18, 2018 both of which are incorporated herein by reference.

BACKGROUND

The present invention is related to methods for forming reproductions which mimic legacy stock images, or multidimensional objects, using modern printing techniques and inks. More specifically, the present invention provides a method for forming a reproduction utilizing iron gall ink printing methods coupled with ink jet image or diffusion production methods. More specifically, the present invention is related to reproduction techniques wherein a, preferably legacy, stock image or multidimensional object is reproduced to provide a reproduction which mimics the stock image or multidimensional image yet the image has an iron gall ink appearance suggestive of an original image or object.

Many legacy images or objects are electronically available to the public as stock items. These images can be downloaded and printed using modern printing techniques, such as by an ink jet printer, or mimicked by 3-dimensional printing or forming techniques to be enjoyed by a new generation. Alternatively, it may be desirable to form a new image or object having an appearance associated with ancient printing techniques, such as iron gall printing, thereby providing an image or item appearing to be quite old. Iron gall printing provides a hue and depth which is unique yet the cost of reproduction using iron gall printing is not financially feasible and the image durability is not suitable.

It has long been the desire of art enthusiast to recapture legacy images or objects in some form which is representative of iron gall printing without the effort and cost associated with actually printing a true iron gall image. It has long been the desire of art enthusiast to replicate stock images, particularly legacy images and objects, cheaply using modern printer techniques while achieving the visual effect associated with iron gall images.

The present invention provides a reproduction technique suitable for use with two-dimensional and three-dimensional elements wherein the image is transformed to one having a visual effect similar to an original iron gall image.

SUMMARY OF THE INVENTION

The invention relates to an improved reproduction technique wherein an image or object can be reproduced and transformed to a replica having iron gall imaging effects.

A particular feature of the invention is the ability to reproduce images and objects quickly, and with limited expense, wherein the image has the effect of a historical image.

These and other embodiments, as will be realized, are provided in a method for replicating an object. The method includes providing an object comprising an outer surface and a channel; applying dry tannin powder to the outer surface of the object wherein at least a portion of the dry tannin powder adheres to the outer surface as imaging tannin; and placing an aqueous solution of an iron salt in the channel wherein the iron salt diffuses through the object to convert said imaging tannin into a replica of the object

DESCRIPTION

The present invention is related to a reproduction technique wherein an image or object can be replicated using diffusion techniques wherein the image or object is transformed to include an iron gall image mimicking the image or object thereby providing a replica with the image or object with a pleasing effect.

The technique for image reproduction will be described with reference to the figures which form an integral, but non-limiting, part of the specification.

Figure 1:
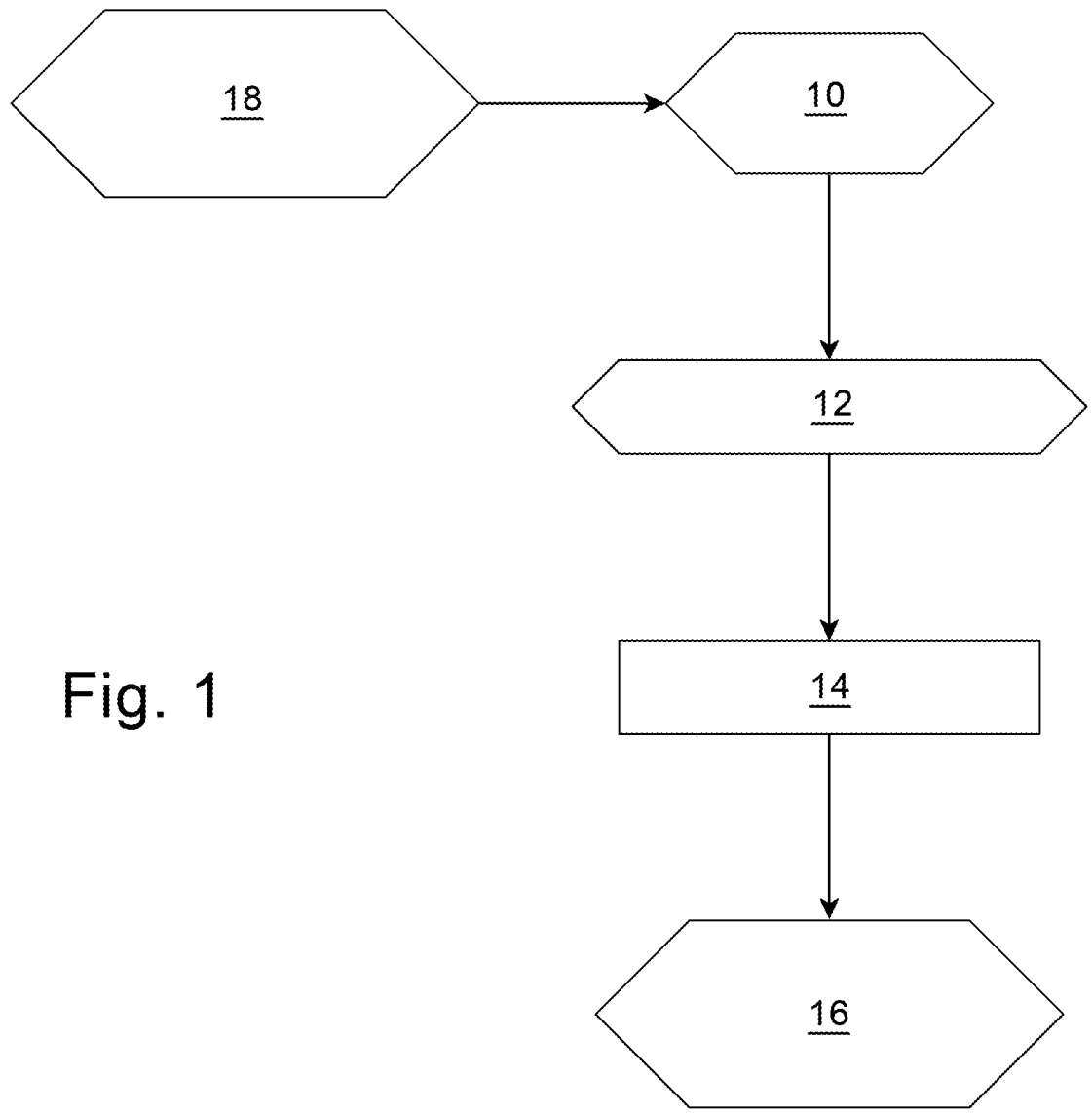
FIG. 1 is a flow chart representation of the invention.

An embodiment of the invention will be described with reference to FIG. 1 wherein an image is reproduced on media which is a two-dimensional object as defined herein. The technique includes the steps of:
printing a stock image, 10, preferably from an ink jet printer, using an ink jet ink, onto a first side of a media;
adding an excess of tannin onto the stock image, 12, within a first time wherein a portion of the tannin adheres to the ink of the stock image as imaging tannin and the remainder of the tannin is unaltered tannin;
removing the unaltered tannin from the media, 14; and
placing an aqueous solution of an iron salt on a second side of the media, opposite the first side, 16, wherein the iron salt migrates or diffuses through the media to convert the imaging tannin into an image reproduction.

In one embodiment a mixture of tannin, iron salts and burnt plate oil can be applied to the media and dried, 18, prior to the inkjet printing. The mixture is activated by the water in the inkjet ink thereby initiating a reaction at contact which extends the working time for application of the tannin.

The media is preferably a planar sheet of, preferably, paper. The thickness, density and composition of the media is not particularly limited with the exception of being suitable for printing with ink jet ink and allowing the iron salt to migrate or diffuse there through. Woven papers are suitable with high cellulose papers being particularly preferred with cotton, linen and others being suitable for demonstration of the invention. It is most preferable that the media be relatively free of metals, particularly iron, which can interfere with the image reproduction process. For the purposes of clarity the media is arbitrarily described as having a first side, which is the side the image is printed on, and a second side, which is opposite the first side and the side treated with iron solution.

The ink jet printer is not particularly limited. It is preferable that the ink jet printer be compatible with a pigment-based ink, and particularly a metal containing pigment, either as part of the black ink or as a component of the ink forming the black ink. Color images can be reproduced, however, a large majority of the stock images, and particularly the legacy stock images, were iron gall ink images and therefore black images. A Canon Pixma M330 using Canon 210 XL Black Ink (PPE-PS-GF25) is particularly suitable for demonstration of the invention due to the low purchase cost, ready availability and relatively low cost of operation.

The ink jet ink is preferably a pigment-based ink, as opposed to a dye based ink, with particularly preferred pigments containing a metal. Pigments comprising at least one of cobalt, nickel, aluminum, zinc and magnesium are preferred with cobalt and nickel being most preferred. Spinets are a particularly preferred pigment with spinels comprising cobalt and nickel being particularly preferred. Rutile is a particularly suitable pigment which can be applied to the paper prior to the iron salts wicking to the inkjet ink.

Tannin is a natural material extracted from plants and algae. Powdered tannin is particularly preferred. Particularly preferred tannins for demonstration of the invention are hydrolysable tannins, phlorotannins and phlobatannis. Hydrolyzable tannins are particularly suitable with gallic acid and gallic acid derivatives being most preferred.

The image as printed on the media, and before application of tannin, is referred to herein as an image precursor. It is preferable that sufficient tannin be applied to cover the image precursor with excess tannin. The process for applying the tannin is not particularly limiting. A process which is particularly suitable is to apply the tannin by slowly pouring, also referred to as dusting, the powdered tannin over the image. In places with no image the tannin should remain as unaltered dry tannin powder. In places with an image precursor present tannin will adhere to the precursor image and the adhered tannin is referred to herein as imaging tannin. It is preferable that the tannin be applied within five (5) minutes and more preferably within two (2) minutes after formation of the image precursor.

The unaltered dry tannin powder can be removed by any means suitable with the proviso that that the imaging tannin is not disturbed. The unaltered dry tannin can be removed by an air flow, brushing or, most preferably, by inverting the media such that the second side is upward thereby allowing the unaltered dry tannin powder to fall from the first side. It is preferable to capture the unaltered dry tannin powder for subsequent use.

After application of the iron salt it is preferable to dry the media to remove any excess water. Excess water can cause the media to become non-planer thereby distorting the image which can become unsightly. Drying is optional and the method of drying is not limited. A standard device utilizing forced air over a heating element is suitable such as a hair dryer or air gun.

After the media is dry it is preferable to press the printed media between two platens to remove any undulations in the media. Glazes can be employed to the image reproduction. Particularly preferred glazes include linseed oil, shellac and micr-crystalline wax.

Figure 2:
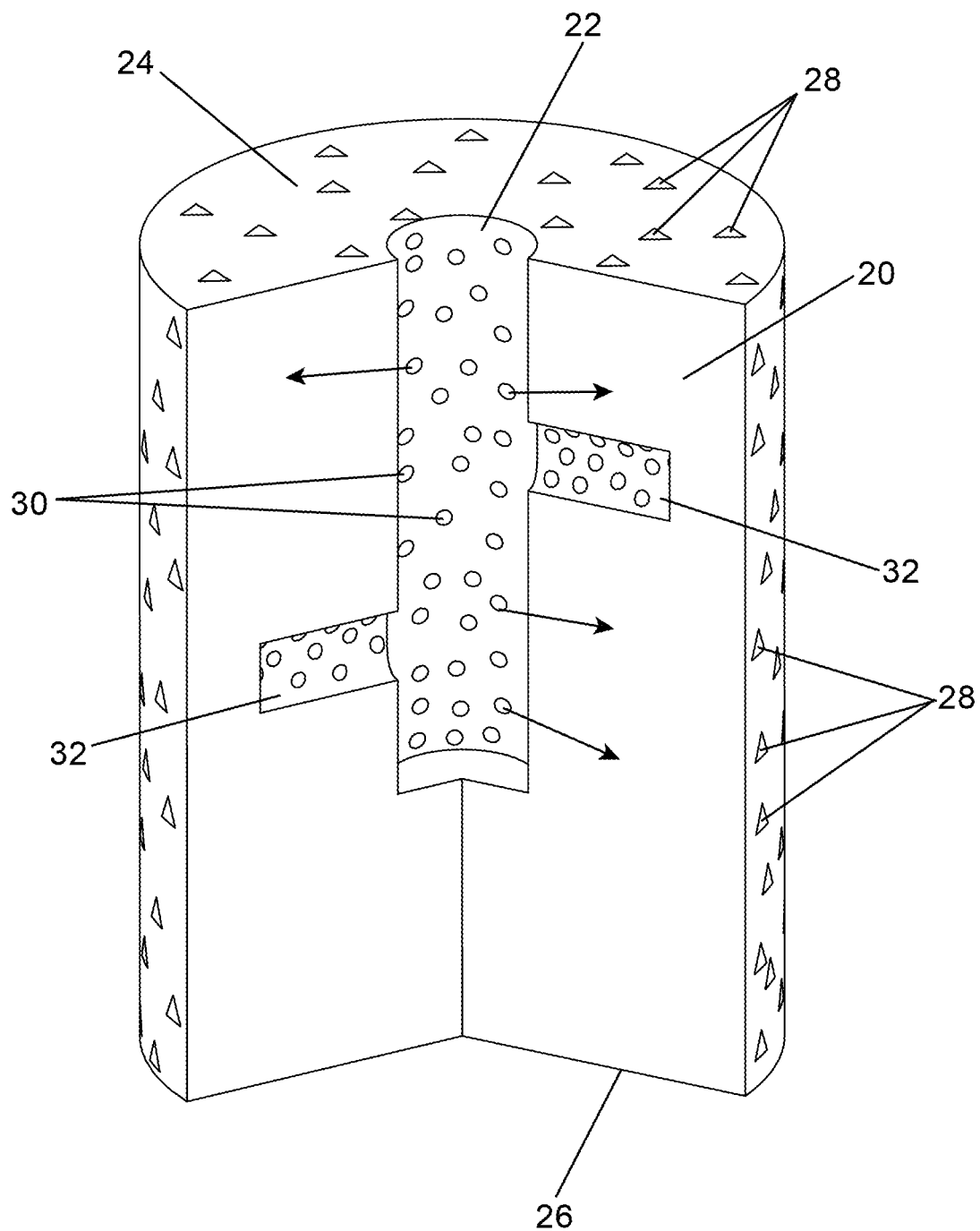
FIG. 2 is a schematic representation of an embodiment of the invention.

An embodiment of the invention will be described with reference to FIG. 2. In FIG. 2, a three-dimensional object, 20, is illustrated in cross-sectional view. In FIG. 2 the three-dimensional object is represented as a cylinder for the purposes of discussion and illustration without limit thereto. A channel, 22, extends from a first surface, 24, into the interior of the three-dimensional object, preferably at least half the distance to the second surface, 26, opposite the first surface. It is preferable that the channel not breach the second surface, or any surface other than the first surface, and therefore the channel can act as a reservoir as will be more fully realized after further discussion. The channel may include branches, 32, which improve the distribution of the iron salt to the surface.

Tannin, 28, is placed, preferably, on all external surfaces of the three-dimensional object preferably in sufficient amount to coat the entire external surface, or at least the portion intending to be replicated, with tannin. If desirable, excess tannin can be removed as discussed above with reference to media. Tannin which remains on the surface is referred to as imaging tannin and any tannin which is removed is referred to as unaltered tannin.

An aqueous solution of iron salt, 30, is placed in the channel wherein the iron salt migrates or diffuses through the three-dimensional object thereby converting the imaging tannin to a reproduction of the three-dimensional object.

In one embodiment a mixture of tannin, iron salts and burnt plate oil can be applied to the three-dimensional object and dried. The mixture is activated by water thereby initiating a reaction at contact which extends the working time for application of the tannin.

In one embodiment the three-dimensional object remains with the reaction products of iron and tannin integral thereto. In another embodiment the three-dimensional object is sacrificial wherein after the reaction of iron and tannin the three-dimensional object is removed thereby forming a replica of the three-dimensional object. If a replica of the three-dimensional object is to be formed it is preferable to utilize enhanced tannin to improve structural integrity as discusses elsewhere herein.

As would be realized the material forming the three-dimensional object is selected from materials that will allow tannin to stick. It is preferred that the material forming the three-dimensional object has a low concentration of metals, is formable and can be cast or formed into a desired shape. Natural products or synthetic products can be used. Particularly preferred materials include cellulose, proteins, yeast, legumes, fats, grains, cereals, rice, rye, cotton, linen, charcoal, hydrotalcite, gluten, collagen fiber, fungus, bacteria, algae, mosses, lichen and calcium deposits.

For the purposes of the instant invention a two-dimensional object is defined as an object having an undefined width and height but a constant thickness. Media such as papers and the like are, for the purposes of this invention, considered to be two-dimensional without regards to the fact that they have a defined, although consistent, thickness. For the purposes of this invention a three-dimensional object is defined as an object have an undefined width and height and a thickness which is not consistent. Three-dimensional objects can have a width, height and thickness which are the same, such as in the case of a sphere, or the three-dimensional object may have a regular or irregular shape.

In an embodiment an enhanced tannin can be used wherein the enhanced tannin comprises a mixture of tannin and a dry powder selected from pigment, minerals, bone, vegetable matter, metals and inert materials. Particularly preferred dry powders are selected from the group consisting of organic pigments, inorganic pigments, geological regolith simulants, Prussian blue and garnet. The dry powder has a preferred particle size of about 79 microns or less or the particles pass through a No. 200 sieve. The weight ratio of tannin to dry powder is preferably at least 1.5:1 to no more than about 5:1. More preferably the weight ratio of tannin to dry powder is at least 2.5:1 to no more than about 3.5:1. The particle size of the dry powder can be reduced, if necessary, by any suitable means including a tumbler attached to an oscillating table with a rotation/oscillation ratio sufficient to reduce the particle size in a reasonable time. A rotation/oscillation ratio of unity is sufficient to demonstrate the invention.

The aqueous solution of iron salt preferably comprises iron in a +3 or +2 oxidation state. $Fe_2(SO_4)_3$, $FeSO_4$, $FeCL_2$ or $FeCl_3$ are imminently suitable for demonstration of the invention. The preferred aqueous solution comprises $FeSO_4$.

The aqueous solution of iron salt is added to the second side of the media opposite the imaging tannin or in the channel of the three-dimensional object. Without being limited to theory, it is hypothesized that the iron and tannin form a complex thereby essentially forming a complex. The manner in which the aqueous solution of iron salt is applied to the media is not particularly limited.

EXAMPLE

An approximately round dough ball was prepared wherein the dough ball comprised a channel therein. An aqueous solution was prepared comprising 1 part rogolith, two parts rutile and six parts tannin. The aqueous solution was applied to the surface of the dough ball and allowed to dry. An iron solution was added to the channel and allowed to diffuse through the dough ball resulting in a surface replication representative of an iron gall replication of the surface.

The invention has been described with reference to the preferred embodiments without limit thereto. One of skill in the art would realize additional embodiments and alterations which are not specifically recited herein but which are within the scope of the invention as set forth in the claims appended hereto.

The invention claimed is:

1. A method for replicating an object comprising:
providing an object comprising an outer surface and a channel;
applying dry tannin powder to said outer surface of said object wherein at least a portion of said dry tannin powder adheres to said outer surface as imaging tannin; and
placing an aqueous solution of an iron salt in said channel wherein said iron salt diffuses through said object to convert said imaging tannin into a replica of said object.

2. The method for replicating an object of claim 1 comprising adding an excess of said tannin to said outer surface wherein a portion of said dried tannin forms said imaging tannin and a remainder of said dry tannin powder is unaltered dry tannin powder; and
removing said unaltered dry tanning powder.

3. The method for replicating an object of claim 1 wherein said object is selected from a two-dimensional object and a three-dimensional object.

4. The method for replicating an object of claim 1 wherein said object comprises a material selected from a natural product and a synthetic product.

5. The method for replicating an object of claim 1 wherein said object comprises at one material selected from the group consisting of cellulose, proteins, yeast, legunes, fats, grains, cereals, rice, rye, cotton, linen, charcoal, hydrotalcite, gluten, collagen fiber, fungus, bacteria, algae, mosses, lichen and calcium deposits.

6. The method for replicating an object of claim 1 wherein said tannin is selected from the group consisting of hydrolysable tannin, phlorotannin and phlobatanni.

7. The method for replicating an object of claim 6 wherein said tannin is gallic acid or a derivative of gallic acid.

8. The method for replicating an object of claim 1 wherein said iron salt comprises a salt of $Fe^{2+}$ or $Fe^{3+}$.

9. The method for replicating an object of claim 8 wherein said iron salt is selected from the group consisting of $Fe_2(SO_4)_3$, $FeSO_4$, $FeCL_2$ or $FeCl_3$.

10. The method for replicating an object of claim 1 wherein said tannin is a enhanced tannin further comprising a dry powder.

11. The method for replicating an object of claim 10 wherein said dry powder is selected from the group consisting of pigment, mineral, bone, vegetable matter, metal and inert material.

12. The method for replicating an object of claim 10 wherein said dry powder is selected from the group consisting of organic pigments, inorganic pigments, geological regolith simulants, Prussian blue and garnet.

13. The method for replicating an object of claim 10 wherein said dry powder has a particle size of no more than 79 microns.

14. The method for replicating an object of claim 10 wherein said enhanced tannin comprises a weight ratio of tannin to dry powder of at least 1.5:1 to no more than 5:1.

15. The method for replicating an object of claim 14 wherein said weight is at least 2.5:1 to no more than 3.5:1.

* * * * *